United States Patent [19]

Charriau et al.

[11] Patent Number: 4,757,693
[45] Date of Patent: Jul. 19, 1988

[54] AIR CONDITIONING SYSTEM FOR A MOTOR VEHICLE

[75] Inventors: Philippe Charriau, Boulogne Billancourt; François Bancon, Saint Germain en Laye, both of France

[73] Assignee: Regie Nationale des Usines Renault, Boulogne Billancourt, France

[21] Appl. No.: 41,285

[22] Filed: Apr. 22, 1987

[30] Foreign Application Priority Data

Apr. 22, 1986 [FR] France .................. 86 05778

[51] Int. Cl.⁴ ............................ F25B 49/00
[52] U.S. Cl. .......................... 62/126; 62/228.3
[58] Field of Search ............. 62/126, 125, 127, 129, 62/228.1, 228.3, 323.4, 323.1, 133; 236/94; 165/11

[56] References Cited

U.S. PATENT DOCUMENTS

| | | | |
|---|---|---|---|
| 2,057,101 | 10/1936 | Kägi | 62/228.3 X |
| 4,307,775 | 12/1981 | Saunders et al. | 62/127 X |
| 4,356,704 | 11/1982 | Izumi | 62/228.3 X |
| 4,557,114 | 12/1985 | Kato et al. | 62/126 |
| 4,558,306 | 12/1985 | Freliech | 62/127 |

FOREIGN PATENT DOCUMENTS 2107905  5/1983  United Kingdom ............. 62/129

Primary Examiner—Harry B. Tanner
Attorney, Agent, or Firm—Oblon, Fisher, Spivak, McClelland & Maier

[57] ABSTRACT

The invention relates to an air conditioning system for a motor vehicle, including a cooling circuit equipped with a compressor (1) associated with a clutch (8), a condenser (2), a pressure reducer (4) and an evaporator (5). An electric circuit (22) has mounted therein, in series, a coil of the clutch (8), a pressure contact (10) for measuring the excess pressure of the cooling circuit, a pressure contact (11) for measuring the underpressure in the cooling circuit, a thermostat (13), and a shunt and detector (18, 19) for monitoring the electric continuity of the circuit. An electronic control circuit (20) controls, in case of electric interruption, an electric display component (21) mounted on the dashboard of the vehicle.

2 Claims, 2 Drawing Sheets

AIR CONDITIONING SYSTEM FOR A MOTOR VEHICLE

BACKGROUND OF THE INVENTION

1. Field of the Invention

This invention relates to an air conditioning system for a motor vehicle, comprising a cooling circuit equipped with a compressor associated with a clutch, a condenser, a pressure reducer and a heat evaporator serving as an exchanger.

2. Discussion of Background

Systems of the above type exist. An air conditioning system, also called air conditioner, has the function of producing and circulating fresh, dry air inside the passenger compartment of the vehicle. It functions according to a principle identical with that of domestic refrigerators.

Optimum functioning of the system depends on the good general functioning of each of the components. The system loses efficiency when failures appear which do not totally neutralize the air conditioning and are therefore not easily discernible by the user.

SUMMARY OF THE INVENTION

This invention has as its object a means to signal the system failures to the user and, consequently, to signal that the system is not functioning under optimum conditions. For this purpose, the invention monitors the continuity of the electric circuit between the output of the air conditioning thermostat and the clutch of the compressor. It makes it possible to detect a drop in Freon pressure due to a poor filling of the circuit, to leaks or to the bursting of a pipe of the circuit.

The invention makes it possible to detect an abnormal rise in the Freon pressure, for example, due to plugged or iced pressure reducer, iced evaporator, motor-driven cooling fan unit poorly connected or out of service. It also makes it possible to detect a poor electrical connection of the clutch of the compressor and more generally any fault of the electric circuit. The invention detects these failures in the system is a whole and does not localize the failure of a particular component.

According to this invention, there is provided an electric circuit in which are mounted in series a clutch coil, a pressure contact for measuring the excess pressure of the cooling circuit, a pressure contact for measuring the underpressure in the cooling circuit, a thermostat, means for monitoring the electric continuity of said circuit and means to control—by means of an electronic control circuit, in case of electric interruption—an electric display component mounted on the dashboard of the vehicle.

BRIEF DESCRIPTION OF THE DRAWINGS

The invention will now be described in more detail with reference to a particular embodiment given by way of example and represented by the accompanying drawings in which.

DETAILED DESCRIPTION OF THE PREFERRED EMBODIMENTS

Figure 1:
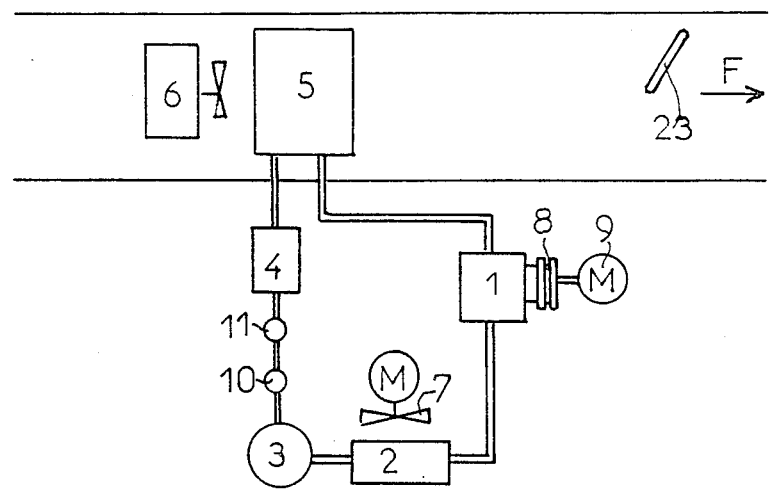
FIG. 1 is a simplified diagram of an air conditioning system according to the invention.

With reference to the figures, the system consists of a circuit filled with Freon. A compressor 1 compresses the Freon at high pressure. It is coupled, by an electromagnetic clutch 8, to a motor 9.

Compressor 1 delivers the Freon into a condenser 2 where the gas is coated and liquefied. A motor-driven fan unit 7 is placed near condenser 2 so as to cool the latter. The gas then passes through a separator tank 3 where residual gas is separated from the liquid Freon. The liquid is then expanded is a pressure reducer 4. Due to the pressure reduction, the Freon is evaporated in the coil of an evaporator 5 which is located in a duct serving the passenger compartment. This change from the liquid state to the gaseous state is derived by drawing heat from the ambient air aspirated by a fan 6 through the fins of evaporator 5. The cooled air is sent back into the passenger compartment along arrow F by fan 6. The fluid in the gaseous state then returns to the compressor 1 and the cycle begins again.

A thermostat 13 (FIG. 2) is placed on the evaporator.

A pressure sensor 10 for excess pressure and a pressure sensor 11 for underpressure are installed in the cooling circuit between the separator tank and the pressure reducer.

A mixing flap 23 is placed in the air duct going to the passenger compartment. This mixing flap 23 is used to regulate the temperature. It is controlled in position by an electric motor 14.

Downstream from the air duct are placed air distribution flaps that are used to distribute the air-conditioned air to various outlets (feet, defogging, ventilation). These flaps are controlled by an electric motor 15 for control of air distribution via a potentiometer and a single-acting low-pressure cylinder controlled by a solenoid valve 16.

The control unit of the system has a control panel 17 equipped with a stop button 171 and buttons 172 to 174.

Thermostat 13, stop-start contact 12 for the air conditioning, pressure sensor contact 10 for excess pressure sensor, pressure contact 11 for underpressure and clutch coil 8 are connected in series in an electrical circuit 22. A shunt 18 is mounted in series with the preceding components. A failure detection circuit 19 is connected to the terminals of this shunt.

Figure 2:
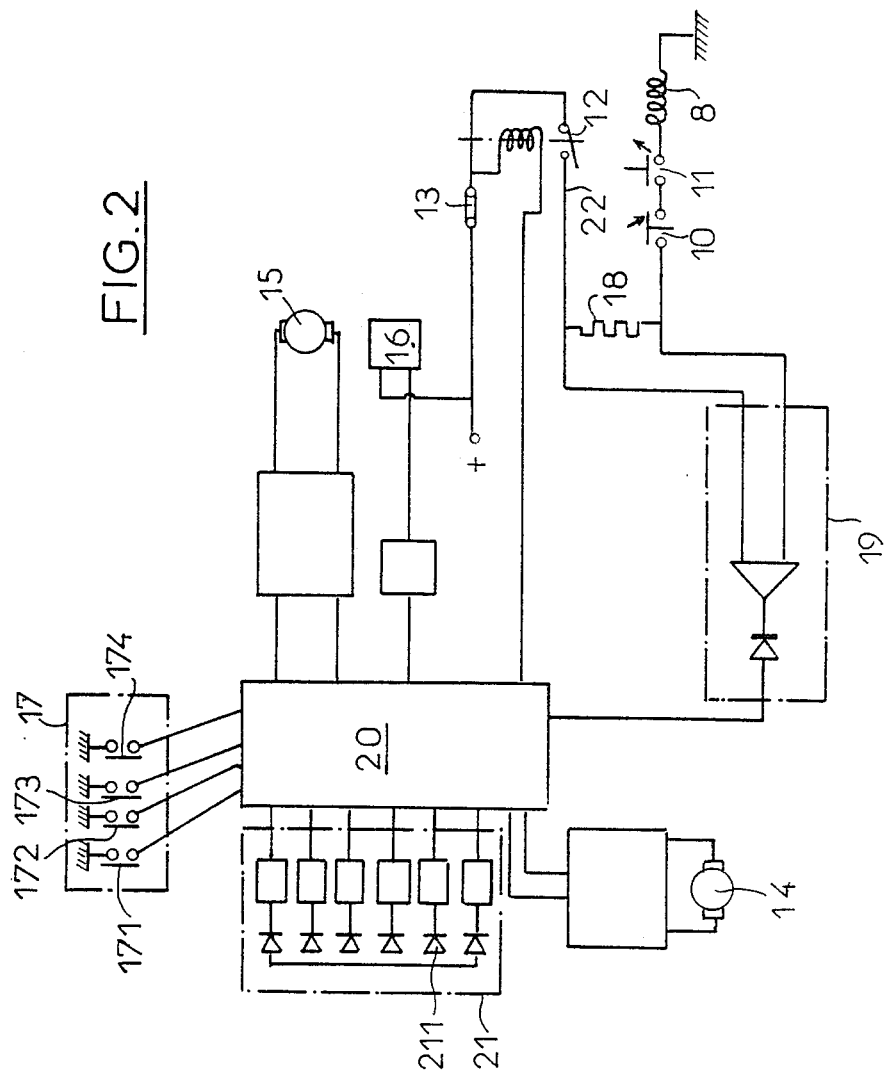
FIG. 2 represents a portion of the electric diagram of the system.

In the embodiment of FIG. 2, the control unit has an electronic circuit 20 which controls air distribution motor 15, solenoid valve 16 and temperature control motor 14. This circuit is constituted by a microprocessor.

Detection circuit 19 furnishes a digital signal to an input of microprocessor 20. The microprocessor controls a display unit 21 comprising, for example, light-emitting diodes 211 or equivalent elements. These diodes are associated with the buttons controlling the air conditioning. Moreover, the microprocessor controls stop-start contact 12.

Detection circuit 19 receives as input the voltage taken at the terminals of the shunt and furnishes as output a digital signal having different levels depending on whether interconnection circuit 22 is open or closed.

The operation of the system is as follows.

Detection circuit 19 monitors the continuity of circuit 22 between the ground of the clutch and the thermostat. In case of interruption, the level of the output signal of circuit 19 changes. If the operation selected by buttons 172 to 174 requires the starting of air conditioning, microprocessor 20 triggers the blinking of indicator diode 211 corresponding to the operation chosen and the air conditioning is cut off. By way of illustration, the blinking of the diode occurs at a frequency of 2 hertz.

Figure 3:
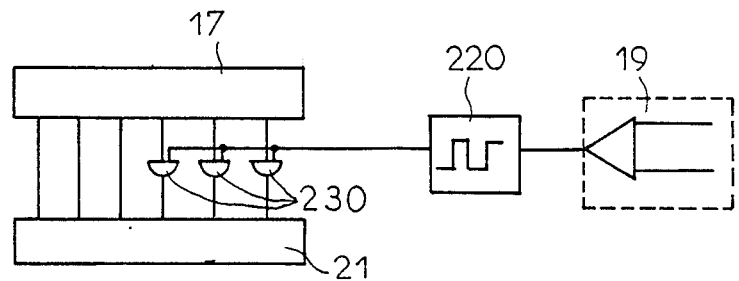
FIG. 3 is a variant of the electric diagram of FIG. 2.

In the embodiment of FIG. 3, the output of the detection circuit is connected to an astable circuit 220 whose output is coupled to circuits 230. Each of these circuits 230 of the AND type receives on an input the signal coming from circuit 220 and at another input the signal coming from control panel 17. The outputs of these circuits 230 control display 21.

It is well understood that, without going outside the scope of the invention, variants and improvements of details and the use of equivalent means can be conceived.

What is claimed is:

1. An air conditioner system for a vehicle, comprising:
    a cooling circuit comprising a compressor having an electromagnetic clutch, a condenser, an excess pressure sensor, an underpressure sensor, a pressure reducer, and an evaporator having a thermostat;
    an electrical circuit including, in series, a coil of said clutch, a contact of said excess pressure sensor, a contact of said underpressure sensor, a stop-start contact, said thermostat and means for monitoring the continuity of said electrical circuit;
    an electric display component mounted on said vehicle; and
    digital control means responsive to a detection of an interruption of said electrical circuit by said monitoring means for providing an interruption display signal to said display component, wherein said monitoring means comprise a shunt in said electrical circuit between said stop-start contact and one of said sensors, and a digital detection circuit means connected to the terminals of said shunt for outputting a signal to said control means.

2. The system of claim 1 wherein said control means is a microprocessor.

* * * * *